Dec. 20, 1966  R. STASSE  3,292,527
APPARATUS FOR PREPARING AND DISPENSING BEVERAGES
FROM PREFABRICATED CARTRIDGES AND A LIQUID
Filed March 2, 1964  2 Sheets-Sheet 1

ROLAND STASSE

Karl G. Ross
AGENT

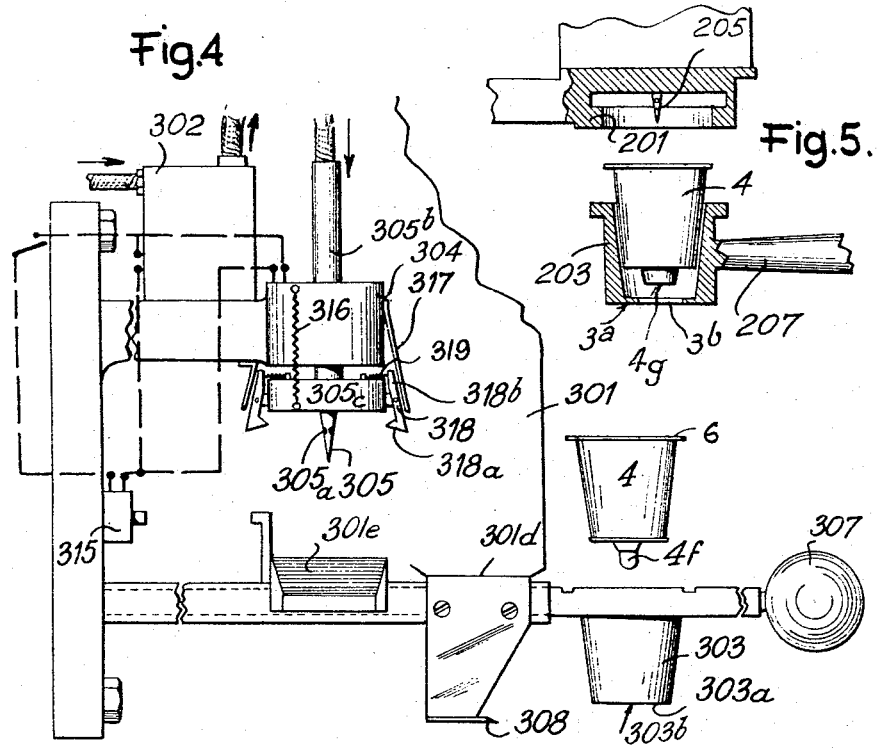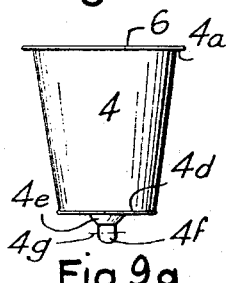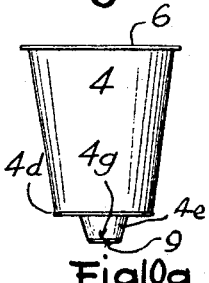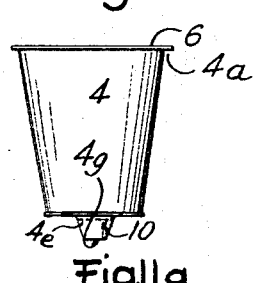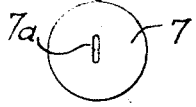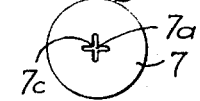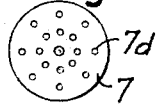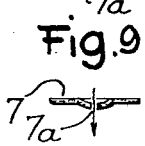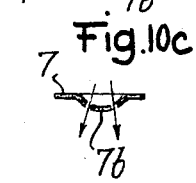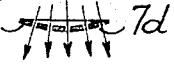
ROLAND STASSE
INVENTOR
AGENT United States Patent Office 3,292,527
Patented Dec. 20, 1966

3,292,527
APPARATUS FOR PREPARING AND DISPENSING BEVERAGES FROM PREFABRICATED CARTRIDGES AND A LIQUID
Roland Stasse, 23 Ter Av. du Chateau, Bourg-la-Reine (Seine), France
Filed Mar. 2, 1964, Ser. No. 348,706
Claims priority, application France, Mar. 4, 1963, 926,660
5 Claims. (Cl. 99—295)

This invention relates to a novel apparatus of the type used for producing a beverage drink by treatment, such as dilution, dissolution, lixiviation or decoction by means of a liquid, of a substance contained in a prefabricated cartridge or like container with a view to dispense the beverage or drink thus obtained in containers such as tumblers, cups, etc.

Another object of the invention is to provide an apparatus adapted to deliver in succession different drinks or beverages without allowing the drink or beverage to contact the basic elements of the apparatus.

With the above objects in view the invention consists also in the novel features of construction of prefabricated cartridges.

The apparatus of this invention comprises two bodies or sections. The upper body is provided with a pipe nozzle communicating through at least one cock or valve with at least one liquid feed pipe (the feed liquid being hot or cold water) and with a perforating member; the lower body is constituted as a tubular, preferably frusto-conical cartridge holder and is characterized in that the base of the cartridge holder is formed with a relatively large orifice and that the cartridge designed to fit into the cartridge holder presents, in use, a relatively small orifice at its base. The two orifices being coaxial to permit the direct flow of the beverage from the cartridge into an underlying container cup, or tumbler, the beverage having been prepared within said cartridge without any contact whatsoever with said cartridge holder.

The cartridge necessary for use with the apparatus broadly described hereinabove comprises a substantially frusto-conical or tubular enclosure containing the beverage-generating product and is characterized in principle in that its upper orifice, surrounded by an external flange, is closed by a lid fastened on said flange, said flange and/or said lid constituting the sealing gasket between the two bodies or sections of the apparatus during its use.

Preference will now be made to the accompanying drawing illustrating diagrammatically several embodiments of this invention. In the drawing:

FIGURE 4 is a fragmentary side elevational view showing an embodiment of an automatic apparatus;

FIGURE 5 is a partial sectional view showing a fourth embodiment of the apparatus, with a separate cartridge holder;

Figure 1:
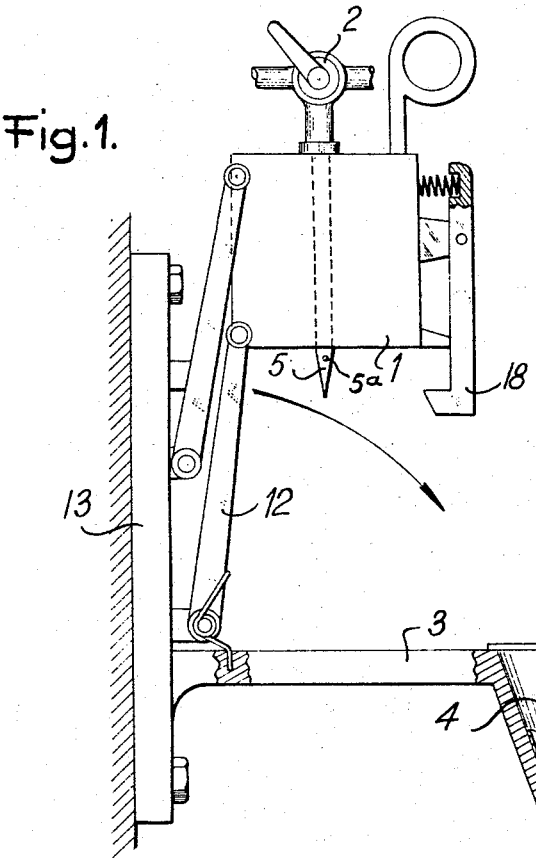
FIGURE 1 is a diagrammatic side-elevational view of the apparatus for dispensing beverages with parts broken away.
Figure 2:
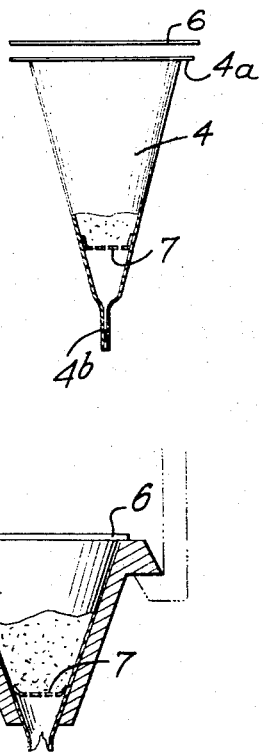
FIGURE 2 is an elevational view, partly in section of a cartridge designed for use with the apparatus of FIG. 1.

FIGURES 6 and 7, and 8, are side elevational views showing three different cartridges designed for use with the apparatus of this invention;

FIGURES 9a, 10a, 11a and 12a, are plan views showing four different types of perforated disc intended for use in a cartridge;

FIGURES 9b, 10b, 11b and 12b, are diametral sections of these discs respectively; and FIGURES 9c, 10c, 11c and 12c, illustrate, in section, the deformation produced in the discs as a consequence of the passage of the beverage therethrough.

The hitherto known apparatus of the type broadly specified hereinabove are either simple dispensers of a drink ready for consumption which is enclosed in a tank (e.g. as in orangeade dispensers) or devices wherein hot water under pressure flows through a mass of the substance to be infused which is placed in a filter or in a cartridge (for instance as in coffee-making machines of the well-known "Italian" type).

Both types of apparatus have a common incenvenience: they are not capable of delivering in succession different beverages without requiring a complete cleaning of at least the dispensing section of the apparatus.

In fact, in these known apparatus the prepared drink flows through one or more nozzle or spouts forming an integral part of the apparatus. For instance in the case of a coffee-making machines the filter containing the ground coffee is provided as a rule with two spouts for filling simultaneously two cups; to prepare tea with the same apparatus (to the extent that this possibility may be contemplated) would require a through cleaning of this filter and of the spouts attached thereto to avoid the mixing of residual coffee with the tea. It is obvious that this cleaning operation is definitely precluded in so-called self-service apparatus or those available for the members of communities such as schools, workshops, hospitals, etc.

It is therefore current practice to juxtapose several dispensers each designed and/or used for delivering a single type of beverage or drink. This mode of dispensing beverage of drinks is objectionable from the hygienic point of view, for if a relatively long time period (for example overnight, or a week-end) elapses between successive uses of the same apparatus the organic residues commence a fermentation process and produce toxic substances which are incorporated into the drinks dispensed subsequently.

Under these conditions, the high investment cost due to the necessity of using several dispensers for as many types of drink is aggravated by the cost of the labor necessary for frequently cleaning the dispensers.

As clearly shown in FIGURES 1 to 3 and 4, 5 of the drawing, an apparatus according to the invention for delivering a beverage or drink by treating a beverage substance enclosed in a prefabricated cartridge with a liquid and for dispensing the resulting drink into a container such as a tumbler or cup, comprises an upper body or section 1 of which at least one nozzle or pipe is connected to a source of liquid under pressure, as a rule water, through a control cock or valve 2, and a lower body or section 3 constituting a cartridge holder adapted to support a cartridge 4 closed at both ends, one of said bodies or sections being movable in relation to the other.

The upper body 1 is provided with a perforating member 5 adapted to pierce the lid 6 of the cartridge 4 and with at least one nozzle or pipe for delivering liquid under pressure through the upper aperture thus made of the cartridge.

This perforator may be tubular and act at the same time as a liquid-dispensing pipe, the liquid being ejected through lateral orifices 5a, as shown in FIGURE 1.

Due to the relatively high pressure (of the order of 80 to 100 p.s.i.) of the liquid fed to the apparatus (town water supply in the case of cold water, or hot-water pressure in the case of a hot-water generator), some kind of reliable sealing gasket must be provided at the joint between the two bodies in order to avoid unpleasant splashes.

According to the present invention the cartridge 4, formed with a substantially tubular or frusto-conical enclosure, has its upper orifice end surrounded by an external flange 4a constituting a contact and sealing surface for a lid 6.

The flange 4a, the lid 6, or better still their conjugate thickness, provide at no cost the aforesaid necessary sealing gasket inasmuch as the latter is used only once.

The cartridge may be manufactured from very thin pressed metal sheet stock, but injection-molded plastics may also be used. However, cartridge cost may be reduced by resorting to blown or, preferably, blown-stretched plastic whereby the wall thickness of the cartridge may be substantially reduced (i.e. of the order of 0.008″) while preserving a reasonable thickness of the flange 4a. In practice, the cartridge walls have a relatively low mechanical strength and in order to enable them to withstand the relatively high liquid pressure the lateral walls of the cartridge are designed to bear against the inner lateral wall of the cartridge carrier 3, the shapes and dimensions of the cartridge and cartridge holder being chosen accordingly.

Preferably, the cartridge and cartridge holder configuration is substantially frusto-conical with a view to facilitate, on the one hand, the dispersion of the liquid throughout the mass of the product contained in the cartridge and, on the other hand, the ejection of the cartridge after use. The cartridge cone may taper downwards to terminate at lip-like portions 4b, the joined edges of these lips such as 4b (see FIGURE 2) being adapted to be separated or folded away from each other by the liquid pressure.

In all cases it seems preferable to use cartridges having an annular intermediate base or disc 4d (FIGURE 6) adapted to fit on an inner flange 3a of cartridge holder 3 which limits the central orifice 3b, thereof (FIGURE 5, for instance).

Thus, the cartridge is supported firmly both at the top and at the bottom.

The cartridge further comprises an inner perforated disc 7 to be described presently, which is intended to regulate the pressure and acts as a pressure-reducing diaphragm by producing a drop of pressure by throttling thus preventing the delivery of a liquid jet under excessive pressure. This disc is disposed at right angles to the cartridge axis and at a level high enough to lie within the cartridge portion supported by the cartridge holder so as to form between this disc and the outlet orifice a zone 4e acting as an expansion chamber.

Referring to FIGURE 6 it will be seen that this expansion chamber 4e constitutes a projection formed with a nipple 4f adapted to be cut or perforated either manually or mechanically to provide a delivery orifice coaxial with the orifice 3b of the cartridge holder.

In the cartridge illustrated in FIGURE 7 the expansion chamber 4e is perforated beforehand, its orifice being sealed in this case by a patch 9 adhering on the lower face of the bottom of said chamber 4e.

On the other hand, the expansion chamber of the cartridge illustrated in FIGURE 8 is not closed at its base, the sealing patch 10 being cemented on the disc 7 or base 4d, either on the upper face or on the upper face thereof, according to the type of hole formed therein.

Irrespective of the solution chosen for the cartridge design (FIGURES 2, 6, 7 or 8) the coaxial arrangement of the outlet orifices 4g, 3f of the cartridge and of the cartridge holder, respectively, permits the delivery of the beverage flowing therefrom into the tumbler or cup 11 without producing any contact between the liquid and the cartridge holder.

This result is obtained when the lips 4b (FIGURE 2) or the nipple 4b of the cartridge project through the orifice 3f of said cartridge holder and are therefore at a lower level than the base 3a, thereof. Under these conditions, it is possible, by placing cartridges 4 containing different products, into the cartridge holder 3, to obtain as desired different types of beverage without any risk of mixing different products while safeguarding all hygienic requirements.

Of course, the apparatus may be designed in many different manners according to the specific uses contemplated, without departing from the spirit and scope of the invention.

Thus, the apparatus illustrated in FIGURE 1 comprises a fixed lower body 3 supporting the cartridge holder, and a movable upper body 1 pivotally mounted by means of linkage 12 on a wall plate or like bracket or support 13 of body 3, whereby the movable body 1 may be moved away from the cartridge holder.

The body 1 supports the perforating member 5 as well as one or a plurality of liquid feed pipe lines or nozzles (for example one pipe for hot water and another pipe, for cold water) all the feed pipes or nozzles being controlled by means of a common multi-way cock or valve 2. The arrangement may also comprise a plurality of cocks or valves 2 connected through flexible lines to the sources of liqiud. Preferably, the liquids are fed to the cartridge through a common duct consisting of the inner passage of the tubular perforating member 5, and in this case a multi-way cock 2 is used.

This apparatus is completed by a snap-action or spring-loaded device 18 adapted to lock the two bodies of the apparatus against each other during the use thereof.

Figure 3:
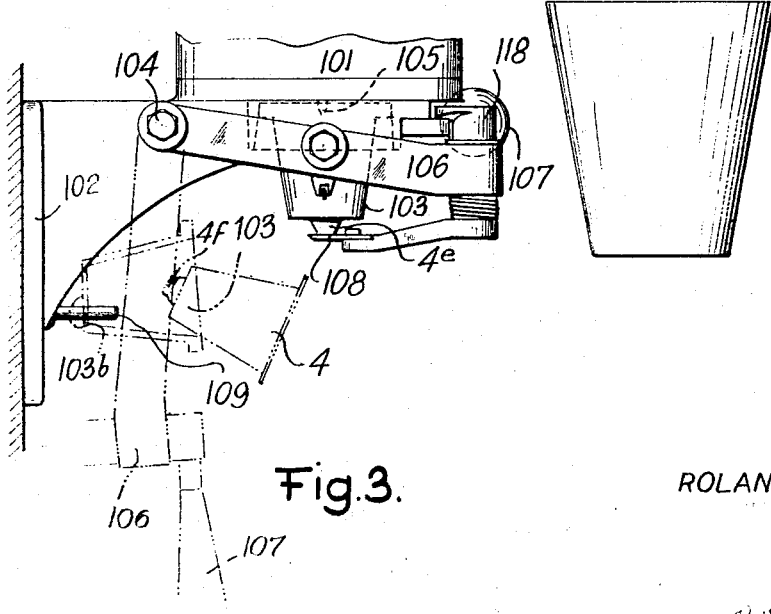
FIGURE 3 is a fragmentary side elevational view showing an embodiment of a semi-automatic apparatus.

The apparatus illustrated in FIGURE 3 is substantially the reverse of the preceding arrangement shown in FIGURE 1 in that the body 101 is stationary and supported by the bracket 102; the cartridge-holding body 103 is adapted to tilt about a horizontal axis 104 from the empty-cartridge ejection position shown in dot-dash lines.

To this end the body of the cartridge holder is rigid with a lever 106 fulcrumed at 104 on the bracket 102 and provided with a handle 107 adapted to swing about a shaft carrying at one end a locking device 118 adapted to engage a cam face of body 101 and at the other end a cutter 108. After having placed the filled cartridge 104 in the apparatus the upward movement of lever 106 causes the cartridge lid to engage the base of body 101 and perforate the lid; the rotation of the control handle 107 first cuts off the nipple 4f and then locks the two bodies against each other.

After the cartridge contents have been dispensed, the reverse movement brings the empty cartridge near the lower portion of the bracket 102 where an ejector 109 passing through the hole 103b forces the bottom 4d of the cartridge inside.

A simpler apparatus, for example suitable for home or family use, may be designed as shown in FIGURE 5 so as to have an independent cartridge holder 203 provided with a handle 207. This cartridge holder is adapted to be secured on the fixed body 201 in the fashion of the well-known Italian coffee-making machines, that is, by means of a bayonet coupling. In this alternate form of embodiment the cartridge, which is of the type illustrated in FIGURE 6, has a nipple 4f to be cut manually.

In the case of public use (public-transport facilities, railway station halls, etc.) the operation of the apparatus must be more automatic in order to preclude any wrong handling thereof.

The apparatus illustrated in FIGURE 4 meets this requirement.

The body 303 acting as a cartridge holder is mounted for horizontal sliding movement in relation to the body 301 secured thereon; a handle 307 permits this movement. The perforator 305 which also acts as a liquid feed duct is mounted for vertical sliding movement, its stem 305b, rigid with the core of an elecromagnet 304 being further connected to a solenoid-operated multi-way valve 302 adapted selectively to connect same to anyone of a plurality of sources of liquid under pressure, e.g. hot or cold water. This stem 305b carries also an annular member 305c on which at least two spring-loaded lock members 318 are pivoted.

This apparatus also has a push-button switch 315 inserted in an electrical circuit. When the body 303 is pulled out from the body 301 a new cartridge can be placed therein. Then the switch is open but ready to close the energizing circuit of electromagnet 304, and the assembly 305, 305a, 305b, 305c and 318 is pulled upwards by the tension spring 316. A leftwards thrust exerted by the user on the handle 307 causes the body 303 to slide horizontally in relation to the body 301 and the nipple 4f is cut by the fixed cutter 308 while the cartridge is held down by the guide 301d; upon completion of this stroke the body 303 depreses the push-button of switch 315, thus closing the energizing circuit of electromagnet 304 and solenoid-operated valve 302, for example through the medium of time relays (not shown).

The assembly 305, 318 is thus lowered and the cartridge lid 6 is perforated and the lock members 318 engage the underside of cartridge 4 through suitable notches formed in the body 303, due to the bevelled portion of the hook-shaped heads 318a of the lock members. The liquid thus infuses the beverage substance in the cartridge. By pulling the handle 307, to the right as seen in the figure, the electromagnet circuit is broken and the spring 316, moves the assembly 305–318, upwardly together with the empty cartridge, until the heel portions 318b of lock members 318 engage corresponding fixed cam members 317 against the resistance of springs 319, thus moving the hook portions 318a radially apart and allowing the empty cartridge to fall onto a deflector 301e adapted to direct it toward a disposal bin or the like whereupon the cycle of operation of the apparatus may be repeated.

Of course, as far as the supply of liquid to the apparatus is concerned, the apparatus illustrated in fragmentary views in FIGURES 3, 4, and 5, may be arranged as set forth hereinabove in connection with FIGURE 1.

The perforated disc 7 plays an important part in obtaining the desired result, on the one hand by creating a pressure drop capable of retarding the outflow through the orifice 4g, not only in order to avoid unpleasant splashes but also for adequately proportioning the output rate of this orifice as a function of the time required for treating the infusible beverage substance to obtain the desired beverage quality it may also act as a filter means.

FIGURES 9a, 9b, and 9c illustrate each a disc 7 formed with a central slot for dissolving fine powdered products (orange powder, lemon powder, etc.).

It will be noted that the deformation of the disc is moderate in use.

FIGURES 10a, 10b, 10c show a similar disc formed with twin slots as required for dissolving coagulation powders such as cocoa milk, etc., the central portion 7b between the slots tending to be slightly more deformed due to the viscosity of the liquid.

FIGURES 11a, 11b, and 11c, show another disc formed with a pair of crossed slots providing four corners 7c adapted to be spread apart under the liquid pressure to permit the passage of the lumps or like solid elements contained in the beverage (for example, herbs for seasoning, mushrooms, meat, etc.).

On the contrary, the disc illustrated in FIGURES 12a, 12b and 12c is formed with small perforations 7d in the fashion of a sieve. This disc is adapted to become and is intended more particularly for infusions, lixiviations and decoctions (coffee, tea, lime-blossom, etc.).

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A beverage-producing and dispensing apparatus, comprising:
 a pair of relatively movable bodies having respective faces juxtaposable in a closed position of said bodies, one of said bodies being formed with a cartridge holder for a beverage cartridge having a closed wide end and a closed narrow end axially spaced from said wide end and containing a beverage substance to be treated with a liquid, said cartridge holder being provided with a relatively wide orifice open in the direction of the other of said bodies at the respective face, with a relatively narrow orifice axially spaced from said wide orifice and axially aligned therewith for receiving said narrow end of said cartridge with a portion thereof protruding through said narrow orifice, and with an annular support wall between said orifices and peripherally hugging said cartridge between said ends for limiting outward expansion thereof upon injection of liquid into said cartridge; and
 piercing means on the other of said bodies engageable with said closed wide end of said cartridge for penetrating same and admitting said liquid into said cartridge and into contact with said substance therein, said faces being in sealed relationship around said piercing means in said closed position of said bodies whereby the opening of said protruding portion of said closed narrow end of said cartridge permits discharge of the beverage prepared therein.

2. An apparatus as defined in claim 1 wherein said piercing means includes a liquid-supply pipe communicating with the interior of said cartridge upon penetration thereof, said apparatus further comprising valve means connected to said pipe for controlling the flow of said liquid therethrough, said cartridge being composed of flexible sheet material and having a perpiheral flange at said relatively wide end overlying said face of said one of said bodies all around said wide orifice whereby said flange is clamped between said faces in said closed position of said bodies to form a gasket surrounding said pipe.

3. An apparatus as defined in claim 2 wherein said cartridge conically tapers from said wide end toward said narrow end and said support wall is the surface of a conical frustum.

4. An apparatus as defined in claim 3 wherein said cartridge includes an imperforate pressure-reducing disk spaced inwardly of the extremity of said projecting portion at said narrow end to define an expansion chamber beyond said substance in said cartridge.

5. An apparatus as defined in claim 3, further comprising cut-off means displaceable relatively to said holder in a plane parallel to said faces and perpendicular to the axis of said cartridge for severing said protruding portion.

References Cited by the Examiner

UNITED STATES PATENTS

| | | |
|---|---|---|
| 1,377,316 | 5/1921 | Clermont. |
| 2,283,967 | 5/1942 | Brown _____ 99—295 X |
| 2,529,395 | 11/1950 | Hummel. |
| 2,615,384 | 10/1952 | Ranz _____ 99—295 X |
| 2,778,739 | 1/1957 | Rodth _____ 99—295 X |
| 2,783,704 | 3/1957 | Liebelt _____ 99—295 |
| 2,939,381 | 6/1960 | McBride _____ 99—295 |
| 3,022,719 | 2/1962 | McNeely _____ 99—295 X |
| 3,139,343 | 6/1964 | Baselt. |
| 3,187,663 | 6/1965 | McLean _____ 99—306 X |
| 3,199,682 | 8/1965 | Scholtz _____ 99—295 X |

FOREIGN PATENTS 666,825   5/1929   France.

WALTER A. SCHEEL, *Primary Examiner.*

S. P. FISHER, *Assistant Examiner.*